United States Patent
Schaumburg et al.

(10) Patent No.: US 10,865,119 B2
(45) Date of Patent: Dec. 15, 2020

(54) PREPARATION OF A METASTABLE TETRAGONAL ZIRCONIA AEROGEL

(71) Applicant: Aproxi APS, Herlev (DK)

(72) Inventors: Kjeld Schaumburg, Herlev (DK); Henrik Tofte Jespersen, Kirke Hyllinge (DK); Per Bækgaard, Hørsholm (DK)

(73) Assignee: Aproxi APS, Herlev (DK)

( * ) Notice: Subject to any disclaimer, the term of this patent is extended or adjusted under 35 U.S.C. 154(b) by 457 days.

(21) Appl. No.: 15/518,599

(22) PCT Filed: Oct. 13, 2015

(86) PCT No.: PCT/DK2015/050314
§ 371 (c)(1),
(2) Date: May 16, 2017

(87) PCT Pub. No.: WO2016/058613
PCT Pub. Date: Apr. 21, 2016

(65) Prior Publication Data
US 2019/0023581 A1  Jan. 24, 2019

(30) Foreign Application Priority Data
Oct. 13, 2014 (DK) .................. 2014 70635

(51) Int. Cl.
*C01G 25/02* (2006.01)
*C04B 35/624* (2006.01)
*C04B 35/486* (2006.01)
*B01J 13/00* (2006.01)
*C04B 35/488* (2006.01)

(52) U.S. Cl.
CPC .......... *C01G 25/02* (2013.01); *B01J 13/0091* (2013.01); *C04B 35/486* (2013.01); *C04B 35/488* (2013.01); *C04B 35/624* (2013.01); *C01P 2002/50* (2013.01); *C01P 2004/51* (2013.01); *C01P 2004/61* (2013.01); *C01P 2006/10* (2013.01); *C04B 2235/765* (2013.01)

(58) Field of Classification Search
CPC .... B01J 13/00; B01J 13/0091; C01P 2004/51; C01P 2004/61; C01P 2002/10; C04B 35/488; C04B 35/624; C04B 35/624624; C04B 35/48; C04B 2235/765; C01G 25/02
See application file for complete search history.

(56) References Cited

U.S. PATENT DOCUMENTS

| 5,840,641 A | 11/1998 | Sterzel et al. |
| 7,595,036 B1 | 9/2009 | Seal et al. |
| 2006/0275620 A1 | 12/2006 | Seal et al. |

FOREIGN PATENT DOCUMENTS

| JP | 2009/215087 A | 9/2009 |
| WO | WO 2005/099652 A1 | 10/2005 |
| WO | WO 2007/101442 A2 | 9/2007 |

OTHER PUBLICATIONS

Suh, D., et al., "Synthesis of High-Surface-Area Zirconia Aerogels With a Well-Developed Mesoporous Texture Using CO2 Supercritical Drying," *Chem. Mater.*, 2002, vol. 14, pp. 1452-1454.
Bedilo, A., et anon., "Synthesis of High Surface Area Zirconia Aerogels Using High Temperature Supercritical Drying," *NanoStructured Materials*, 1997, vol. 8(2), pp. 119-135.
Sui, R., et al., "Direct Synthesis of Zirconia Aerogel Nanoarchitecture in Supercritical $CO_2$," *Langmuir*, 2006, vol. 22, pp. 4390-4396.
Sui, R., et anon., "Synthesis of Metal Oxide Nanostructures by Direct Sol-Gel Chemistry in Supercritical Fluids," *Chem. Ref.*, 2012, vol. 112, pp. 3057-3082.
Stöcker, C., et anon., "Zirconia aerogels: effect of acid-to-akloxide ratio, alcoholic solvent and supercritical drying maethod on structure properties," *Journal of Non-Crystalline Solids*, 1998, vol. 223, pp. 165-178.
Wang, H., et anon., "Characteristics and comparison of metastability of alkoxy-derived tetragonal $ZrO_2$ powders, gels, and films," *Materials Science and Engineering*, 1991, vol. A136, pp. 171-178.

*Primary Examiner* — Smita S Patel
(74) *Attorney, Agent, or Firm* — Womble Bond Dickinson (US) LLP

(57) ABSTRACT

The present application discloses a process for the preparation of metastable tetragonal zirconia in the form of an aerogel material, said material being capable of undergoing martensitic phase transformation to monoclinic zirconia. The application also discloses composite materials, such as dental filling materials, having included therein an aerogel material.

4 Claims, No Drawings

PREPARATION OF A METASTABLE TETRAGONAL ZIRCONIA AEROGEL

CROSS-REFERENCE TO RELATED APPLICATIONS

This application is a national stage filing under 35 U.S.C. 371 of PCT/DK2015/050314 filed Oct. 13, 2015, which International Application was published by the International Bureau in English on Apr. 21, 2016, and application claims priority from Denmark Application No. PA 2014 70635, filed Oct. 13, 2014, which applications are hereby incorporated in their entirety by reference in this application.

FIELD OF THE INVENTION

The present invention relates to the preparation of a metastable tetragonal zirconia aerogel material having good storage stability but at the same time being able to rapidly and effectively undergo a martensitic phase transformation in contact with e.g. water.

BACKGROUND OF THE INVENTION

Zirconia ($ZrO_2$) has widespread utility as a filler ingredient in composite materials, e.g. dental materials. Zirconia can exist in three principal crystalline phases: the tetragonal phase, the cubic phase and the monoclinic phase. The specific volume (density$^{-1}$) of the three phases is 0.16, 0.16 and 0.17 $cm^3/g$, respectively. Martensitic phase transformation of tetragonal phase zirconia to the less dense monoclinic phase zirconia can be utilized in e.g. dental filling materials in order to counteract shrinkage of the bulk dental filling material upon curing (polymerisation) of the polymer/resin base of such materials, cf. e.g. WO 2005/099652 A1.

A broad range of method for the preparation of tetragonal zirconia exists, however only few methods allow for the preparation of tetragonal zirconia which is capable of undergoing a martensitic phase transformation.

Sui and co-workers (Sui et al., Langmuir 2006, 22, 4390-4396) discloses a method for the direct synthesis of a zirconia aerogel nanoarchitecture in supercritical $CO_2$ ($scCO_2$).

Stöcker and Baiker (J. Non-Crystalline Solids 223 (1998) 165-178) disclose the preparation of zirconia aerogels by a sol-gel method using a first phase of tetra-n-butoxy zirconium(IV) in an alcoholic solvent and a second phase of water, alcohol and nitric acid. The amorphous zirconia aerogels underwent low-temperature supercritical drying.

OBJECT OF THE INVENTION

It is an object of embodiments of the invention to provide a novel metastable tetragonal zirconia aerogel materials which, on the one hand, are storage stable under standard conditions for a prolonged period of time and, on the other hand, are capable of efficiently and rapidly undergo a martensitic phase transformation when exposed to, e.g., water.

DISCLOSURE OF THE INVENTION

The present inventors have realised that suitable metastable zirconia aerogel materials can be prepared by conventional polycondensation reactions starting from zirconium(IV) alkoxides followed by treatment with formic acid, flushing with liquid or supercritical $CO_2$ ($scCO_2$) and calcination at specified temperatures.

When used herein, the term "aerogel" in the context of zirconia is intended to mean a porous material thereof having a significantly lower density than a solid zirconia material (5.68 $g/cm^3$), typically a density of 1.0-4.5 $g/cm^3$, such as a density of 2.0-4.0 $g/cm^3$, or a density of 2.0-3.5 $g/cm^3$, or 2.1-3.0 $g/cm^3$.

When used herein, the term "metastable" in the context of tetragonal zirconia is intended to mean that the tetragonal zirconia is not present in a state of least energy, but—at the same time—that the tetragonal zirconia does not spontaneously undergo a phase transformation to the corresponding monoclinic crystalline phase representing a state of least energy. As far as the tetragonal zirconia is metastable, exposure of the surface to water or another "trigger" or to physical stress may cause the tetragonal phase to undergo a martensitic phase transformation to the monoclinic phase, with an associated volume expansion.

When it come to a quantitative understanding of the term "metastable", it will be appreciated that in the context of the present application "zirconia" is to be recognized as being "metastable tetragonal zirconia" (in particular regarding the aerogel materials described herein) insofar that it: (a) has a proportion of tetragonal zirconia of at least 50% based on the total amount of zirconia in the aerogel material (according to the method defined in the Working Examples section); (b) exhibits a phase transformation capability of at least 25% (according to the method defined in the Working Examples section); and (c) exhibits a degree of phase transformation of at the most 5% when stored at 25° C. at 0% relative humidity for 2 months (wherein the degree of phase transformation is determined as described in the Working Examples section for "phase transformation capability" mutatis mutandis).

The General Process

The general process for the preparation of metastable tetragonal zirconia in the form of an aerogel material (e.g. in particulate form) comprises the steps:

(a) allowing zirconium(IV) alkoxide to polycondensate in the presence of one or more $C_1$-$C_4$ carboxylic acids so as to obtain an amorphous zirconia aerogel;

(b) optionally washing said amorphous zirconia aerogel;

(c) treating said amorphous zirconia aerogel with formic acid;

(d) flushing said amorphous zirconia aerogel with liquid or supercritical $CO_2$;

(e) optionally grinding the amorphous zirconia aerogel to obtain a particulate amorphous zirconia aerogel;

(f) heating said optionally particulate amorphous zirconia aerogel under a dry atmosphere at a temperature of in the range of 400-750° C., such as in the range of 600-670° C., so as to obtain an optionally particulate metastable tetragonal zirconia aerogel.

The steps will be further described in detail in the following:

Step (a)—Polycondensation

In the first step, zirconium(IV) alkoxide is allowed to polycondensate in the presence of a $C_1$-$C_4$ carboxylic acid.

The polycondensation reaction is typically conducted in the presence of a solvent, such as $C_1$-$C_4$ alcohols or liquid or supercritical $CO_2$, or a mixture thereof.

In some interesting embodiments, a $C_1$-$C_4$ alcohol is present as a solvent, optionally in combination with liquid or supercritical $CO_2$. The $C_1$-$C_4$ alcohol may be part of the commercially zirconium(IV) alkoxide product.

The polycondensation is not necessarily conducted in a water-free atmosphere, but the water content in the reactants and solvents (e.g. $CO_2$) have to be very limited. If too much water is present, the reaction will be far too fast and an inhomogeneous and non-transparent gel will be formed. The reaction is sometimes referred to as a "water-free" SolGel synthesis, but the reaction is believed to involve a hydrolysis step of a Zr-alkoxo-acetate complex with water formed from the reaction between the carboxylic acid and the alcohol. Hence, traces of water are believed to be required for the polycondensation.

The $C_1$-$C_4$ carboxylic acids used in step (a) are typically selected from formic acid, acetic acid, propionic acid, and butyric acid, as well as dicarboxylic acids like malonic acid and succinic acid. Also, mixtures of $C_1$-$C_4$ carboxylic acids may be used. Particularly interesting are acetic acid and propionic acid, especially acetic acid.

In one embodiment, a $C_2$-$C_4$ carboxylic acid is used. In one currently preferred embodiment, acetic acid is used. In another preferred embodiment, formic acid is used in admixture with a a $C_2$-$C_4$ carboxylic acid. If formic acid is used it is typically only present in amounts up to 30 wt. %, preferably only up to 30 wt. %, in admixture with one more $C_2$-$C_4$ carboxylic acid, preferably acetic acid.

The zirconium(IV) alkoxide is typically selected from $C_2$-$C_5$ alkoxides, such as $C_3$-$C_4$ alkoxides, of which zirconium(IV) propoxide, zirconium(IV) iso-propoxide, zirconium(IV) butoxide and zirconium(IV) tert-butoxide can be mentioned. Currently preferred are zirconium(IV) propoxide and zirconium(IV) butoxide.

The zirconium(IV) alkoxide is typically provided in a solution of the alcohol corresponding to the alkoxide group, typically in a 60-90 wt. % solution.

The density of the resulting aerogel will mainly be determined by the concentration of the zirconium(IV) alkoxide in the alcohol/$C_1$-$C_4$ carboxylic acid. Typically, the concentration of the zirconium(IV) alkoxide is in the range of 0.2-4.0 mol/L, such as in the range of 0.5-3 mol/L, or 0.7-2.5 mol/L. If desirable, the concentration may be adjusted e.g. by addition of an alcohol, typically an alcohol corresponding to alkoxide group of the zirconium(IV) alkoxide.

The molar ratio between the $C_1$-$C_4$ carboxylic acid and the zirconium(IV) alkoxide may also play a role and is typically in the range of 1:1 to 5:1, such as from 1.8:1 to 4:1.

The required amount of the $C_1$-$C_4$ carboxylic acid may either be added to the initial solution or may be added gradually upon stirring. When formic acid ($C_1$) is used (typically in admixture with a $C_2$-$C_4$ carboxylic acid), it is preferred to gradually adding the carboxylic acid under stirring.

The polycondensation reaction is typically conducted at a temperature in the range of 20-100° C., e.g. 35-80° C., such as 35-50° C., or 50-100° C.

Insofar that formic acid ($C_1$) is used, a lower temperature may be beneficial for the polycondensation in view of the significantly higher reactivity of formic acid than that of $C_2$-$C_4$ carboxylic acids, e.g. a temperature in the range of −100 to 50° C., such as −30 to 35° C., or −10 to 35° C., or 0 to 30° C.

The reaction is typically allowed until essentially complete formation of an aerogel is obtained. The total reaction period may be from one to several days, such as period of 48-120 hours. Physical mixing of the reaction mixture may be applied at least in the initial phase of the polycondensation so as to obtain a homogeneous transparent phase.

The resulting polycondensation product is an amorphous zirconia aerogel contaminated with the $C_1$-$C_4$ carboxylic acid, alcohols and other by-products of the process. In order to make the amorphous zirconia aerogel suitable for calcination and formation of metastable tetragonal zirconia (step (f)), it is necessary to efficiently remove such carboxylic acids/by-products, cf. steps (b)-(d) below.

Step (b)—Optionally Washing

After completion of the reaction, the reaction vessel containing the amorphous zirconia aerogel resulting from step (a) is optionally washed so as to remove the majority $C_1$-$C_4$ carboxylic acid, alcohols and other by-products of the polycondensation process. Typically, the solvent used for the reaction in step (a) is used. Examples hereof are $C_1$-$C_6$ alcohols, in particular $C_1$-$C_4$ alcohols.

Washing is typically conducted for a period of 1-12 hours at a temperature of 0-80° C., such as 35-60° C.

Step (c)—Treating with Formic Acid

The amorphous zirconia aerogel is treated with formic acid in order to replace any $C_2$-$C_4$ carboxylic acid, like acetic acid, which may be adsorbed to the surface of the aerogel, and in order to allow react with any unreacted alkoxy groups in that formic acid is more reactive than the $C_2$-$C_4$ carboxylic acids.

Treatment with formic acid is typically conducted for a period of 1-24 hours at a temperature of 0-80° C., such as 35-60° C.

The amount of formic acid used is typically in the range of 2-50 wt. %, such as 5-40 wt. %, based on the weight of the zirconium(IV) alkoxide.

The formic acid is typically diluted in a solvent, such as $C_1$-$C_4$ alcohols or liquid or supercritical $CO_2$, or a mixture thereof.

Step (d)—Flushing with Liquid or Supercritical $CO_2$

Subsequent to the washing/reaction with formic acid, the amorphous zirconia aerogel resulting from step (c) is again flushed with liquid or supercritical $CO_2$ so as to remove remaining formic acid. It will be appreciated that formic acid is less strongly adsorbed to the surface of the aerogel than $C_2$-$C_4$ carboxylic acids, like acetic acid.

It should be understood that steps (b)-(d), and even steps (a)-(d), may be conducted in as one continuous process. The temperature for these three steps is typically kept at the same level, e.g. in the range of 0-200° C., such as 35-60° C.

In some interesting embodiments, the vessel temperature may afterwards be raised to 200° C. or more for a period of time, e.g. 1-24 hours, so as to allow volatile organic constituents in the gel to be removed. Standing at elevated temperature may also have a positive influence on the maturing of the aerogel.

Also, although steps (b)-(d) are described as separate steps, washing (step (b)), treatment (step (c)) and flushing (step (d)) may be conducted as one continuous step wherein the content of formic acid is simply varied.

After flushing (step (d)), the pressure is typically slowly released from the supercritically-gaseous phase avoiding any two-phase system so as to avoid collapse of the aerogel. The aerogel may subsequently be further dried, e.g. by moderate heating, for example up to 200° C.

Although not particularly practical or desirable, it is understood that the resulting amorphous zirconia aerogel—if found convenient—may be transferred (preferably under a dry atmosphere) to another vessel after step (a), after step (b), after step (c) or after step (d) as the case may be.

Step (e)—Optional Grinding of the Aerogel

Depending on the final use of the metastable tetragonal zirconia aerogel, it may be advantageous to grind the amorphous zirconia aerogel to a suitable particle size before calcination (step (f)), because physical manipulation (e.g.

grinding to a smaller particle size) of the resulting metastable zirconia in itself may cause a martensitic phase transformation.

The term "grinding" as used herein refers to any process for reducing the particle size of the material in question. Grinding includes processes known as grinding, milling, ball-milling, sieving, crushing, etc. Suitable equipment for "grinding" will be known to those working in the field of particle size reduction and includes ball-mills, cutting mills, sieves, etc.

The particulate amorphous zirconia aerogel obtained after grinding preferably has a particle size relevant for the final use of the metastable tetragonal zirconia aerogel.

Insofar that the final use is a dental filling material, it is in some embodiment preferred that the particle size is less than 100 μm, such as in the range of 1-100 μm, or 3-70 μm, or 5-50 μm, or 5-40 μm.

In other embodiments, the particle size distribution is such that the D10 value is from 30 μm to 100 μm and 90%. In some variants hereof, the D10 value is from 30 μm to 90 μm, or from 30 μm to 80 μm, or from 30 μm to 70 μm, or from 40 μm to 100 μm, or from 40 μm to 90 μm, or from 40 μm to 80 μm, or from 40 μm to 70 μm, or from 50 μm to 100 μm, or from 50 μm to 90 μm, or from 50 μm to 80 μm, or from 50 μm to 70 μm. Preferably particles representing sizes above 200 μm represent less than 5% (by volume), such as less than 3% (by volume).

Step (f)—Calcination

The calcination plays an important role for the conversion of the (optionally particulate) amorphous zirconia aerogel to the (optionally particulate) metastable tetragonal zirconia aerogel.

According to the invention, the calcination temperature should be preferably be in the range of 400-750° C., e.g. above 600° C., such as in the range of 500-700° C. Especially preferred is calcination at a temperature in the range of 600-670° C., in particular in the range of 620-660° C., such as 630-655° C. The calcination should be conducted in a dry oxygen-containing atmosphere so as to facilitate formation of tetragonal zirconia and so as to burn off any remaining organic matter such as formic acid.

The calcination suitable takes place for ½-10 hours, such as 1½-3 hours, and in some embodiment within 2-2½ hours. If required, cooling off of the (optionally particulate) metastable tetragonal zirconia aerogel may require ½-1 hours.

The calcination is conducted in a suitable furnace, e.g. in a tube furnace. Such a tube furnace may have three zones, first a loading zone, secondly a hot zone and finally a cooling off zone. The latter may advantageously be connected to a humid free glove box with a dew point of −40° C. or below. A flow of dry air is constantly flowing through the tube from the glove box, thereby keeping also the tube furnace humid free during the calcination.

Insofar that the metastable tetragonal zirconia aerogel is present as a block or large particles, it may be desirable to grind the material so as to obtain a suitable particle size.

The material may be ground either as a raw form prior calcination (step (e)) or as crystalized form after calcination. Regardless of that aerogel preserves its original transparency. This is an alternative if grinding before calcination in large scale processes results in a partial collapse of the aerogel surface which would compromise transparency of the small aerogel particles, which—for some applications like dental filling materials—would have to be individually transparent.

Alternatively (such as in the preparation of a dental material), the metastable tetragonal zirconia aerogel may be mixed with a monomer of a polymerizable resin base which is then at least partially polymerized, after which the composite-type material is ground in, e.g., a cutting mill to the desired size.

However as mentioned above, grinding is preferably applied before calcination so as to avoid premature martensitic phase transformation.

The First Main Embodiment of the Process

The first main embodiment of the process for the preparation of metastable tetragonal zirconia in the form of an aerogel material (e.g. in particulate form) comprises the steps:

(a1) allowing zirconium(IV) alkoxide dissolved in liquid or supercritical $CO_2$ to polycondensate in the presence of one or more $C_1$-$C_4$ carboxylic acids in a pressurized reaction vessel so as to obtain an amorphous zirconia aerogel;

(b1) optionally washing said amorphous zirconia aerogel with liquid or supercritical $CO_2$;

(c1) treating said amorphous zirconia aerogel with formic acid in liquid or supercritical $CO_2$;

(d1) flushing said amorphous zirconia aerogel with liquid or supercritical $CO_2$;

(e) optionally grinding the amorphous zirconia aerogel to obtain a particulate amorphous zirconia aerogel;

(f) heating said optionally particulate amorphous zirconia aerogel under a dry atmosphere at a temperature of in the range of 400-750° C., such as in the range of 600-670° C. so as to obtain an optionally particulate metastable tetragonal zirconia aerogel.

The steps will be further described in detail in the following:

Step (a1)—Polycondensation

In the first step, zirconium(IV) alkoxide dissolved in liquid or supercritical $CO_2$ is allowed to polycondensate in the presence of a $C_1$-$C_4$ carboxylic acid.

In one embodiment, the polycondensation is conducted at above the supercritical conditions for $CO_2$ ($scCO_2$), in particular if a $C_2$-$C_4$ carboxylic acid is used.

Insofar that formic acid ($C_1$) is used, a lower temperature, e.g. at which $CO_2$ is liquid, may alternatively be used for the polycondensation in view of the significantly higher reactivity of formic acid than that of $C_2$-$C_4$ carboxylic acids, e.g. a temperature in the range of −10 to 35° C., or 0 to 30° C., at a pressure at which $CO_2$ is in liquid form.

The zirconium(IV) alkoxide is typically selected from $C_2$-$C_6$ alkoxides, such as $C_3$-$C_4$ alkoxides, of which zirconium(IV) propoxide, zirconium(IV) iso-propoxide, zirconium(IV) butoxide and zirconium(IV) tert-butoxide can be mentioned. Currently preferred are zirconium(IV) propoxide and zirconium(IV) butoxide.

The zirconium(IV) alkoxide is typically provided in a solution of the alcohol corresponding to the alkoxide group, typically in a 60-90 wt. % solution.

The $C_1$-$C_4$ carboxylic acids used in step (a1) are typically selected from formic acid, acetic acid, propionic acid, and butyric acid. Also, mixtures of $C_1$-$C_4$ carboxylic acids may be used. If formic acid is used it is typically only present in amounts up to 50 wt. %, such as up to 30 wt. %, in admixture with one more $C_2$-$C_4$ carboxylic acid, preferably acetic acid.

In one currently preferred embodiment, acetic acid is used. In this embodiment, supercritical $CO_2$ is used as the solvent.

In another preferred embodiment, formic acid is used. In this embodiment, supercritical or liquid $CO_2$ is used as the solvent.

The density of the resulting aerogel will mainly be determined by the concentration of the zirconium(IV) alkoxide in the alcohol/$C_1$-$C_4$ carboxylic acid. Typically, the concentration of the zirconium(IV) alkoxide is in the range of 0.2-4.0 mol/L, such as in the range of 0.5-3 mol/L, or 0.7-2.5 mol/L. If desirable, the concentration may be adjusted e.g. by addition of an alcohol, typically the alcohol corresponding to alkoxide group of the zirconium(IV) alkoxide.

The molar ratio between the $C_1$-$C_4$ carboxylic acid and the zirconium(IV) alkoxide may also play a role and is typically in the range of 1:1 to 5:1, such as from 1.8:1 to 4:1.

The required amount of the $C_1$-$C_4$ carboxylic acid may either be added to the initial solution or may be added gradually upon stirring. When formic acid ($C_1$) is used, it is preferred to gradually adding the carboxylic acid under stirring.

For the purpose of the polycondensation under supercritical conditions for $CO_2$, a pressurized reaction vessel suitable for reactions under high pressure is necessary. Such equipment which allows for addition of reactions and flushing with $CO_2$ is available. An example hereof is described by Sui et al. (ibid) as a 10 mL stainless-steel view cell connected to a syringe pump (Isco 100 DM) for pumping $CO_2$. The temperature and the pressure can be measured and controlled by means of a temperature controller (Fuji), a pressure transducer (Omega) and a control valve (Badger) which communicates with a computer via a network interface (National Instruments). Such a set-up is further described in Sui et al., Langmuir 2005, 21, 6150. Many alternative set-ups with similar functionality will be known to those working with reactions under supercritical conditions for $CO_2$.

The polycondensation reaction is typically conducted at a temperature in the range of 35-80° C., such as 35-50° C., typically at a pressure of 80-600 bar. Alternatively, in particular when formic acid is used, the reaction may be conducted at a temperature in the range of −10 to 35° C., such as 0-35° C., typically at a pressure of 80-600 bar.

The reaction is typically allowed until essentially complete formation of an aerogel is obtained. The total reaction period may be from one to several days, such as period of 48-120 hours. Physical mixing of the reaction mixture may be applied at least in the initial phase of the polycondensation so as to obtain a homogeneous transparent phase.

The resulting polycondensation product is an amorphous zirconia aerogel contaminated with the $C_1$-$C_4$ carboxylic acid, alcohols and other by-products of the process. In order to make the amorphous zirconia aerogel suitable for calcination and formation of metastable tetragonal zirconia (step (f)), it is necessary to efficiently remove such carboxylic acids/by-products.

Step (b1)—Optionally Washing with Liquid or Supercritical $CO_2$

After completion of the reaction, the reaction vessel containing the amorphous zirconia aerogel resulting from step (a1) is typically washed with liquid or supercrictial $CO_2$ so as to remove the majority $C_1$-$C_4$ carboxylic acid, alcohols and other by-products of the polycondensation process.

Flushing is typically conducted for a period of 1-12 hours at a temperature of 0-80° C., such as 35-60° C.

Step (c1)—Treating with Formic Acid in Liquid or Supercritical $CO_2$

A $C_2$-$C_4$ carboxylic acid is used in step (a1) either alone or in admixture with formic acid, and therefore the amorphous zirconia aerogel is treated with formic acid in liquid or supercrictial $CO_2$ in order to replace any $C_2$-$C_4$ carboxylic acid, like acetic acid, which may be adsorbed to the surface of the aerogel, and in order to allow the formic acid to react with any unreacted alkoxy groups in that formic acid is more reactive than the $C_2$-$C_4$ carboxylic acids.

Treatment with formic acid is typically conducted for a period of 1-24 hours at a temperature of 0-80° C., such as 35-60° C.

The amount of formic acid used is typically in the range of 2-50 wt. %, such as 5-40 wt. %, based on the weight of the zirconium(IV) alkoxide.

Step (d1)—Flushing with Liquid or Supercritical $CO_2$

Subsequent to the treatment with formic acid, the reaction vessel containing the amorphous zirconia aerogel resulting from step (c1) is flushed with liquid or supercritical $CO_2$ so as to remove remaining formic acid. It will be appreciated that formic acid is less strongly adsorbed to the surface of the aerogel than $C_2$-$C_4$ carboxylic acids, like acetic acid.

The flushing is typically followed by controlled venting of reactor from the supercritical conditions.

It should be understood that steps (b1)-(d1), and even steps (a1)-(d1), may be conducted in as one continuous process without release of the pressure. The temperature for these three steps is typically kept at the same level, e.g. in the range of 0-80° C., such as 35-60° C.

In some interesting embodiments, the vessel temperature may afterwards be raised to 200° C. or more for a period of time, e.g. 1-24 hours, so as to allow organic constituents to evaporate. Standing at elevated temperature may also have a positive influence on the maturing of the aerogel. The elevation of the temperature is equally relevant for step (b1) insofar that steps (c1) and (d1) are omitted.

Also, although steps (b1)-(d1) are described herein as separate steps, washing (step (b1)), treatment (step (c1)) and flushing (step (d1)) may be conducted as one continuous step wherein the content of formic acid is simply varied.

After washing, treatment and flushing (steps (b1)-(d1)), the pressure is typically slowly released so as to avoid collapse of the aerogel.

Although not particularly practical or desirable, it is understood that the resulting amorphous zirconia aerogel—if found convenient—may be transferred (preferably under a dry atmosphere) to another vessel after step (a1), after step (b1), after step (c1) or after step (d1) as the case may be.

Steps (e) and (f)

These steps are as described further above.

Embodiments of the First Process

In one embodiment of the first process of the invention, the preparation of an aerogel material of tetragonal zirconia essentially follows the procedure disclosed by Sui and co-workers (Sui et al., Langmuir 2006, 22, 4390-4396) and utilizes the same type of equipment, however at least with the important modifications that (i) the initially prepared aerogel is treated with formic acid, and (ii) the calcination is conducted at a temperature in the range of 600-670° C., cf. the step (c1) and (f) described in detail above.

The Second Main Embodiment of the Process

The second main embodiment of the process for the preparation of metastable tetragonal zirconia in the form of an aerogel material (e.g. in particulate form) comprises the steps:

(a2) allowing zirconium(IV) alkoxide to polycondensate in the presence of one or more $C_1$-$C_4$ carboxylic acids in a $C_1$-$C_4$ alcohol so as to obtain an amorphous zirconia aerogel;

(b2) optionally washing said amorphous aerogel with a $C_1$-$C_4$ alcohol;

(c2) treating said amorphous zirconia aerogel with formic acid;

(d2) flushing said amorphous zirconia aerogel with liquid or supercritical $CO_2$;

(e) optionally grinding the amorphous zirconia aerogel to obtain a particulate amorphous zirconia aerogel;

(f) heating said optionally particulate amorphous zirconia aerogel under a dry atmosphere at a temperature of in the range of 400-750° C., such as in the range of 600-670° C. so as to obtain an optionally particulate metastable tetragonal zirconia aerogel.

The steps will be further described in detail in the following:

Step (a2)—Polycondensation

In the first step, zirconium(IV) alkoxide dissolved in a $C_1$-$C_4$ alcohol is allowed to polycondensate in the presence of a $C_1$-$C_4$ carboxylic acid as described above for the General Process, step (a).

The polycondensation reaction is typically conducted at a temperature in the range of 20-100° C., e.g. 35-80° C., such as 50-100° C.

Step (b2)—Optionally Washing

The washing may be conducted as described above for the General Process, step (b), so as to remove the majority $C_1$-$C_4$ carboxylic acid, alcohols and other by-products of the polycondensation process.

The washing is typically conducted using the same solvent as used for the reaction in step (a). Examples of suitable solvents are $C_1$-$C_6$ alcohols, in particular $C_1$-$C_4$ alcohols.

Step (c2)—Treating with Formic Acid

The amorphous zirconia aerogel is treated with diluted formic acid as described above for the General Process, step (c), order to replace any $C_2$-$C_4$ carboxylic acid, like acetic acid, which may be adsorbed to the surface of the aerogel, and in order to allow react with any unreacted alkoxy groups in that formic acid is more reactive than the $C_2$-$C_4$ carboxylic acids.

Step (d2)—Flushing with Liquid or Supercritical $CO_2$

Subsequent to the treatment with formic acid, the reaction vessel containing the amorphous zirconia aerogel resulting from step (c2) is flushed with liquid or supercritical $CO_2$ so as to remove remaining formic acid, cf. the description above for the General Process, step (d). In some variants, the amorphous zirconia aerogel is optionally flushed with a solvent miscible with liquid or supercritical $CO_2$ before it is flushed with liquid or supercritical $CO_2$.

Steps (e) and (f)

These steps are as described in detail further above for the General Process, step (e) and step (f).

An Aerogel Material of Metastable Tetragonal Zirconia

The methods according to the invention give rise to a hitherto unknown material, namely an aerogel material of metastable tetragonal zirconia ("metastable tetragonal zirconia aerogel").

Typically, the aerogel material of metastable tetragonal zirconia will have a density of less than 5 g/cm³, more typically in the range of 1.0-4.5 g/cm³, such as a density of 2.0-4.0 g/cm³, or a density of 2.0-3.5 g/cm³, or 2.1-2.9 g/cm³.

When referred to as tetragonal zirconia, the material typically has a proportion of tetragonal zirconia of at least 50%, such as at least 60%, or at least 70%, preferably at least 80%, based on the total amount of zirconia in the aerogel material (according to the method defined in the Working Examples section). Any non-tetragonal portion of the zirconia is typically amorphous or monoclinic.

The proportion of tetragonal zirconia is determined by XRD analysis as described in the Working Examples section.

In some important embodiments, the metastable tetragonal zirconia aerogel as a free material (e.g. a block or a powder) has a phase transformation capability (according to the method defined in the Working Examples section) of at least 60%, such as at least 70%, in particular at least 80%, an even more preferably at least 85%.

The metastable tetragonal zirconia aerogel may be present in particulate form, e.g. having a particle size of less than 100 µm, such as in the range of 1-100 µm, or 3-70 µm, or 5-50 µm, or 5-40 µm. For the purpose dental filling materials, it is believed that particles having a size of less than about 5 µm will cause undesirable scattering of light, and such small particles are therefore preferably removed by sieving.

When referred to herein, the term "particle size" in connection with a range is intended to mean that at least 90% by volume of the particles are within the defined range. Preferably, at least 95% by volume, more preferably 99% by volume of the particles are within the defined range.

The conventional understanding of dental composites is that the particle size distribution of inorganic fillers would normally be from 100-200 nm and up to 2-3 µm with the main portion of particles having a size of around 1 µm. The main reason is the need for a high degree of wear resistance and polish ability. This is however the particle sizes that would result in maximum light scattering is this interval was used for the aerogel particles and thus a very opaque composite. Compared to the normal in-organic fillers, the aerogel is not solid but a porous monolithic three-dimensional structure of nanoparticles. The interconnected porous three-dimensional structure of the aerogel particles may be filled with the same resin as the one in which the aerogel is to become incorporated before polymerisation. This will secure a continuous unbroken resin phase in and outside the aerogel corns. Therefore, the aerogel can be polished in layers and is resistant to wear. The aerogel will be worn gradually but not torn out as one piece when exposed to e.g. chewing of abrasive food.

Hence, the present inventors have realised that an ideal particle size distribution of the aerogel also may be somewhat larger particles, e.g. between 40-50 µm up to 100-150 µm due to a balance of minimising light scattering and the wish to maximise the aerogel content. Hence, in such embodiments, the predominant portion (by volume) of the particles represents sizes at or above a certain size limit whereas a minor portion of the particles represents sizes above this size limit. This is represented by a D10 value which can be provide by an apparatus used for determining the particle size distribution.

Hence, in particular the D10 value (volume) is from 30 µm to 100 µm. In some variants hereof, the D10 value is from 30 µm to 90 µm, or from 30 µm to 80 µm, or from 30 µm to 70 µm, or from 40 µm to 100 µm, or from 40 µm to 90 µm, or from 40 µm to 80 µm, or from 40 µm to 70 µm, or from 50 µm to 100 µm, or from 50 µm to 90 µm, or from 50 µm to 80 µm, or from 50 µm to 70 µm. Preferably particles representing sizes above 200 µm represent less than 5% (by volume), such as less than 3% (by volume).

The desired particle size distribution can be obtained by conventional methods, e.g. by sieving, etc.

The aerogel material of metastable tetragonal zirconia is believed to consist of a network of tetragonal zirconia crystals, such crystals typically having a size of 8-30 nm, such as 8-25 nm or 10-30 nm.

Prepolymerized Aerogel Filler

In the process of its preparation, the zirconia aerogel material may be captured in a polymerized resin prior to be mixed with a monomer of a polymerizable resin base (for examples hereof, see further below).

It should be understood that the zirconia aerogel materials need not necessarily be predominantly tetragonal phase zirconia and not necessarily being metastable. Hence, the zirconia aerogel material may be prepared as described herein, but may also be prepared in according with conventional procedures as described by i.a. Sui and co-workers and Stocker and Baiker (see above in the Background section). Hence, the zirconia aerogel material may be predominantly tetragonal zirconia, predominantly monoclinic zirconia, and it may be stable or metastable, as found desirable.

Hence, the present invention also provides a prepolymerized aerogel filler in the form of a zirconia aerogel material, e.g. as defined hereinabove, having in the pore thereof a polymerizable resin base, wherein said resin base is at least partially polymerized.

The desirable particle size is typically obtained by grinding or milling the composite-type material to the desired size. Relevant size distributions (D10) are e.g. those described above under the section "An aerogel material of metastable tetragonal zirconia", i.e. a distribution wherein the D10 value from 30 µm to 100 µm. Preferably particles representing sizes above 200 µm represent less than 5% (by volume), such as less than 3% (by volume).

Such prepolymerized aerogel fillers may be useful since it will display a modified moisture sensitivity compared to the empty aerogel. The polymer may be of a composition different from the external resin. This may improve stability under milling and shearing processes. By suitable choice it may also modify the refractive index of the prepolymerized aerogel fillers.

The use of a prepolymerized aerogel filler (metastable or stable, as the case may be) in dental composites mainly serve two purposes: (i) if the aerogel is metastable it ensures expansion of the aerogel structure inside the composite when submitted to the triggering mechanism, and (ii) if the aerogel is stable it can contribute to improving the physical properties in a composite (a role often played by silanized glass in dental composites at present).

Novel Composite Materials

It is believed that insofar the aerogel material of metastable tetragonal zirconia as described and defined above is used in composite materials, such as dental filling materials, such composite materials will also represent novel subject-matter.

Also, the invention provides a composite material having included therein a polymerizable resin base and an aerogel material.

Hence, the present invention also provides a composite material comprising a polymerisable resin base and metastable tetragonal zirconia in the form of an aerogel as defined hereinabove.

The metastable tetragonal zirconia aerogel materials typically have the characteristics otherwise described herein, e.g. with respect to particle sizes. Also, the zirconia aerogel materials may also be in the form of the prepolymerized aerogel fillers described above.

In one important embodiment, the composite material comprises 20-80 wt. %, such as 25-70 wt. %, of a polymerisable resin base, 10-50 wt. %, such as 15-40 wt. %, of the particulate metastable tetragonal zirconia aerogel, and 0-70 wt. %, such as 20-60 wt. %, of one or more fillers, additives, and colouring agents.

For dental filling materials, a conventional polymerizable resin base is composed of Bis-GMA (bis phenol-A glycidyl dimethacrylate) and other dimethacrylate monomers (TEGDMA (triethylene glycol dimethacrylate), UDMA (urethane dimethacrylate), HDDMA (hexanediol dimethacrylate). In addition of the metastable tetragonal zirconia aerogel, a dental filling material may comprise other filler materials such as silica and, if desirable, a photoinitiator and e.g. dimethylglyoxime so as to achieve certain physical properties such as flowability.

When incorporated in a resin, the measured degree of phase transformation is somewhat lower under the conditions specified in the method defined in the Working Examples. Hence in some interesting embodiments, the phase transformation capability (according to the method defined in the Working Examples section) of the metastable tetragonal zirconia aerogel incorporated in a resin is at least 25%, such as at least 30%, in particular at least 35%, an even more preferably at least 40%.

When formulated in a composite material having a water content of at the most 0.2 wt. % according to the Karl Fischer analysis (as for most common resin bases for dental filling materials), the metastable tetragonal zirconia aerogel is typically quite stable, i.e. shows no phase transformation to monoclinic zirconia, or at the most a degree of phase transformation of less than 5%, when store for up to 10 days.

The composite material may be supplemented with filler, e.g. glass fillers, additives and colouring agents. The latter may be organic pigments and/or metal oxides suitable to obtain the desired shade of the composite (e.g. a dental filling material). Also, the composite materials defined herein may be in the form of adhesives, etc.

Composites with Large Zirconia Particles

The present inventors believe that the concept of incorporating somewhat larger zirconia aerogel particles into composites in combination with a polymerizable resin base and the advantages e.g. with respect to reduced light scattering, the ability to allow polishing and the resistance to wear, may be expanded to zirconia aerogel materials not necessarily being predominantly tetragonal phase zirconia and not necessarily being metastable.

Hence, the present invention provides a composite material having included therein a polymerizable resin base and a zirconia aerogel material.

Also, the present invention provides a composite material comprising a polymerisable resin base and zirconia aerogel material wherein the zirconia aerogel material has particle size distributions (D10) as those described above under the section "An aerogel material of metastable tetragonal zirconia", i.e. a distribution wherein the D10 value from 30 µm to 100 µm. Preferably particles representing sizes above 200 µm represent less than 5% (by volume), such as less than 3% (by volume).

In one important embodiment hereof, the composite material comprises 20-80 wt. %, such as 25-70 wt. %, of a polymerisable resin base, 10-50 wt. %, such as 15-40 wt. %, of the zirconia aerogel material, and 0-70 wt. %, such as 20-60 wt. %, of one or more fillers, additives, and colouring agents.

With in this aspect of the invention, the zirconia aerogel material may be prepared as described herein, but may also be prepared in according with conventional procedures as described by i.a. Sui and co-workers and Stocker and Baiker (see above in the Background section). Hence, the zirconia aerogel material may be predominantly tetragonal zirconia, predominantly monoclinic zirconia, and it may be stable or metastable, as found desirable. Also, the zirconia aerogel materials may also be in the form of the prepolymerized aerogel fillers described above.

Also, the zirconia aerogel material may be mixed with a monomer of a polymerizable resin base which is then at least partially polymerized, after which the composite-type material is ground in, e.g., a cutting mill to the desired size.

General Remarks

Although the present description and claims occasionally refer to a $C_1$-$C_4$ carboxylic acid, an aerogel, etc., it should be understood that the products and methods defined herein may comprise one, two or more types of the individual constituents or elements. In the embodiments wherein two or more different constituents are present, the total amount of the respective constituents should correspond to the amount defined herein for the individual constituent.

Throughout the specification the word "comprise", or variations such as "comprising" or "comprises", will be understood to imply the inclusion of a stated element, integer or step, or groups of elements, integers or steps, but not the exclusion of any other element, integer or step, or groups of elements, integers or steps.

WORKING EXAMPLES

The Proportion of Tetragonal Zirconia

The proportion of tetragonal zirconia is determined by XRD analysis using a Bruker D8 advance, 2Theta analysis. The XRD analysis is performed by 2θ analysis of a powder sample or a composite of the powder in a resin (bisGMA:UDMA:TEGDMA (40:40:20 by weight)+0.3 wt % campherquinone+0.6 wt % dimethylaminobenzoic acid ethyl ester (DABE)). Analysis of the ratio between the two phases is done by comparing the areas of the (1,1,1) reflection of the tetragonal and the monoclinic phases.

The incorporation of the sample in a resin prevented premature phase transformation of the tetragonal crystals.

Phase Transformation Capability

The "phase transformation capability" of an aerogel material of tetragonal zirconia is determined according to the following method:

A sample of the batch of a metastable tetragonal zirconia aerogel is analysed by XRD so as to determine proportion of tetragonal zirconia within the sample (T0).

Another sample of the batch of an aerogel material is allowed to stand exposed to ambient atmosphere for 10 minutes at 25° C. at 70% relative humidity. The material is subsequently analysed by XRD so as to determine proportion of tetragonal zirconia within the sample (T10).

The phase transformation capability, PTC, (%) is expressed as

PTC (%)=(T0−T10)/(T0)*100%

Insofar that the tetragonal zirconia aerogel is present in e.g. a resin matrix, such material is first isolated from the resin matrix and are then analysed by XRD as described above.

The Stability of the Tetragonal Zirconia Aerogel Material

Correspondingly, the stability (i.e. the degree of phase transformation) is determined by storing a sample of the tetragonal zirconia aerogel material in a dry atmosphere at 25° C. for a predetermined period of time.

Determination of Particle Size Distribution

The particle size distribution is determined by Differential laser diffraction of a sample suspended in ethanol and assuming spherical particles using a Beckmann Coulter LS 13 320 fitted with an Universal Liquid module, with an assumed refractive index of particles of 2.2 and an imaginary refractive index of 0.8. The result is derived using Mie theory and using Polarization Intensity Differential Scattering (PIDS).

Results are reported as a distribution of particles at D10, D25, D50, D75 and D90 (by volume).

Determination of Translucency of Composite Materials

Relative translucency is evaluated by measuring a transparency of a 2 mm thick sample with UV-VIS spectrophotometer over the wavelength range from 300 nm to 800 nm.

The specimen for the investigation is prepared as a composite of 20 vol. % of the zirconia aerogel and 80 vol. % of a resin (bisGMA:UDMA:TEGDMA (40:40:20 by weight)+0.3 wt % campherquinone+0.6 wt % dimethylaminobenzoic acid ethyl ester (DABE)). The composite was curing with Demi™ Plus over 1 minute between two microscopic glasses being 2 mm apart. Wavelength of 450 nm to 470 nm and shifting output intensity from 1,100 mW/cm$^2$ to a peak of 1,330 mW/cm$^2$.

Preparation of Zirconia Aerogels

Materials

ZBO1: Zirconium(IV) butoxide solution 80 wt. % in 1-butanol used as received from Aldrich chemistry ZBO2: Zirconium(IV) butoxide solution 80 wt. % in 1-butanol used as received from abcr GmbH & Co. KG HAc: Acetic acid, 98-100% used as received from Bie&Berntsen FAc: Formic acid, 98-100% used as received from Sigma-Aldrich

Example 1—Preparation of Aerogel of Zirconia in Acetic Acid in scCO$_2$

After a few minutes of mixing 20.06 g ZBO1 with 5.71 g HAc in a 37 mL pressure vessel, $CO_2$ was applied until a pressure of 450 bars at a temperature of 40° C. was reached. The mixing was continued for 17 hours and the reaction mixture was then allowed to react for further 48 hours without mixing. The product was cleaned by flowing 3-5 g/minute $CO_2$ through the vessel at 450 bars and 40° C. for 2 hours. While everything still was kept at 450 bars and 40° C., a second reaction with FAc was carried out. This was done by connecting to another 37 mL pressure vessel loaded with 5 g FAc pumping 1 g/minute $CO_2$ through the series of reactors for 3½ hours, until acid could be collected at the reactor vessel outlet. Subsequently the reaction was allowed to take place at static conditions for 18 hours. The remaining acid was thereafter removed by 5 hours flow with 1-2 g/minute of $CO_2$ again at 450 bars and 40° C. Then the temperature was raised to 200° C. and the pressure at the same time reduced to 100 bars by controlled release of $CO_2$ over a period of 1 hour followed by ½ hours flow with 2-3 g of preheated $CO_2$/minute at the new conditions. The product was allowed to mature for 16 hours at 200° C. and 100 bars. It was then cleaned by approx. 5 g/minute of $CO_2$ flow for 3 hours. The pressure was released during 35 minutes and the sample was allowed to cool down. After opening the pressure vessel, 7 g of $ZrO_2$ aerogel ("$ZrO_2$ Aerogel 1") was collected and transferred to an airtight container under nitrogen.

Example 2—Preparation of Aerogel of Zirconia in Acetic Acid in scCO$_2$ (Large Scale)

After a few minutes of mixing 271.03 g ZBO2 with 77.41 g HAc in a 500 mL pressure vessel, $CO_2$ was applied until a pressure of 450 bars at a temperature of 40° C. was reached. The mixing was continued for 65 hours while the mixture was allowed to form gel. The product was cleaned by flowing 6-7 g/minute $CO_2$ through the vessel at 450 bars and 40° C. for 7 hours. While everything still was kept at 450 bars and 40° C., a second reaction with FAc was carried out. This was done by connecting to another 500 mL pressure vessel loaded with 67.5 g FAc pumping 5 g/minute $CO_2$ through the series of reactors for 2 hours, until acid could be collected at the reactor vessel outlet. Subsequently the reaction was allowed to take place at static conditions for 14½ hours. The remaining acid was thereafter removed by 8 hours flow with 6 g/minute of $CO_2$, static for 15½ hours and again 4 hours flow with 7 g/minute $CO_2$ all at 450 bars and 40° C. Then the temperature was raised to 200° C. and the pressure at the same time reduced to 100 bars by controlled release of $CO_2$ over a period of 2 hours followed by 2 hours flow with approx. 5 g of preheated $CO_2$/minute at the new conditions. The product was allowed to mature for 16 hours at 200° C. and 100 bars. It was then cleaned by approx. 8-12 g/minute of $CO_2$ flow for 4 hours. The pressure was released during 1½ hour and the sample was allowed to cool dawn. After opening, 94.53 g of $ZrO_2$ aerogel ("$ZrO_2$ Aerogel 2") was collected from the pressure vessel and transferred to an airtight container under nitrogen.

Example 3—Calcination of $ZrO_2$ Aerogel 1 and $ZrO_2$ Aerogel 2

An amorphous zirconia aerogel ($ZrO_2$ Aerogel 1 and $ZrO_2$ Aerogel 2) prepared according to Examples 1 and 2 were each milled to a particle size of up to 100 micrometer in a cutting mill. The particulate aerogel material was then placed in a ceramic tray and entered into a 650° C. hot zone of a tube furnace. The tube furnace had three zones, first a loading zone, secondly the hot zone and finally a cooling off zone. The latter was connected to a humid free glove box with a dew point of −45° C. or below. A flow of dry air was constantly flowing through the tube from the glove box, thereby keeping the tube humid free during the calcination.

The calcination was conducted for 2 hours in the hot zone. Hereafter, the tray with the particulate metastable tetragonal zirconia aerogel was pushed into the cooling off zone and was kept for 0.5 hours. Thereafter, the tray and resulting material could be handled manually.

The resulting metastable tetragonal zirconia aerogel showed a content of tetragonal phase zirconia of 90% for $ZrO_2$ Aerogel 1 and above 85% for $ZrO_2$ Aerogel 2 analysed as composites.

The resulting metastable tetragonal zirconia aerogel showed a phase transformation capability of 82% for $ZrO_2$ Aerogel 1 and above 85% for $ZrO_2$ Aerogel 2 analysed as powder in air.

The density of the aerogels were approx. 2.5 $g/cm^3$.

Example 4—Preparation of Aerogel in Acetic Acid 542.27 g of zirconium(IV)butoxide (ZBO2) and 144.33 g of Acetic acid were thoroughly mixed under heavy stirring for the first half an hour and heated to 80° C. for 21 hours. Subsequently slow addition of 10 g acetic acid was followed by heavy mixing for 2½ hours at 80° C. After staying for additional 2 hours the gel was formed. The gel was matured additionally for 48 hours at 80° C. The matured gel was allowed to cool for half an hour before it was cut into 1-2 $cm^3$ pieces. The pieces were kept under ½ L of ethanol and a mixture of 130 g formic acid diluted up to ½ L with ethanol were slowly added during gentle agitation. The liquid including small white particles was changed with ½ L of fresh ethanol every second day.

A ½ Litre flow vessel was filled with the prepared gel pieces under ethanol. Additional ½ L ethanol was flowed through at a flowrate of 5 mL/min. The temperature was raise from room temperature to 80° C. and the pressure was increased to 100 bars with a rate of 3 bars/min by pumping ethanol. $CO_2$ was flown through at 100 bars in order to remove solvents and by-products. The flow was set to 2-3 g $CO_2$/min for 16 hours followed by 5 g/min for additionally 6 hours. The pressure was released slowly over several hours and of big very transparent slightly yellowish aerogel pieces ("$ZrO_2$ Aerogel 3") were collected from the vessel and transferred to an airtight container under nitrogen.

The resulting metastable tetragonal zirconia aerogel showed a content of tetragonal phase zirconia of 84% analysed as a composite.

The resulting metastable tetragonal zirconia aerogel showed a phase transformation capability of 64% analysed as powder in air.

The density of the aerogel was approx. 2.5 $g/cm^3$.

Example 5—Preparation of Aerogel of Zirconia in a Mixture of Acetic Acid and Formic Acid An experiment is started with 54.2 g of the tetrabutoxy-zirconate solution containing 80% of the zirconate and 20% butanol placed in a 100 ml beaker with lid. 20 gram 100% ethanol was added under stirring. To this is added a mixture of 9.95 g glacial acetic acid and 5.2 gram formic acid. The acids were mixed in a beaker and afterwards they were added using a pipette through a whole in a lid within 3 minutes. By this procedure fast stirring is possible without contact to air. The mixture got warm approximately 40° C. but was clear yellow. The total volume is now close to 100 ml. The reason for this choice of volume expansion is that thereby the gel volume is double of the zirconia butoxide. This is also the situation in the half liter $scCO_2$ reactor in Example 1. The solution was placed in an ultrasonic bath at 30° C. During the US treatment the temperature was raising to 54° C. In the solution small bubbles are constantly formed but floating to the top due to the ultrasound. The gel formed with 45 min. After 3 hours, 100% ethanol was added to cover the gel and the beaker was left for 20 hours for the gel to mature. The gel is cut into pieces and placed in ethanol for 24 hours. This process is repeated 3 times. Hereafter a colourless transparent gel is present. The gel is transferred to the reactor and supercritically washed as in Example 1. The gel showed shrinking to a degree of 50% during the washing but the pieces remained transparent after washing ("$ZrO_2$ Aerogel 4"). The density of the aerogel was approx. 2.5 $g/cm^3$.

Example 6—Preparation of Large Particles

An amorphous zirconia aerogel ($ZrO_2$ Aerogel 1 and $ZrO_2$ Aerogel 2) prepared according to Examples 1 and 2 were each milled to a particle size of up to 150 micrometer in a cutting mill. A fraction of aerogel material from 90 to 150 μm was collected with sieving, placed in a ceramic tray and entered into a 650° C. hot zone of a tube furnace. The tube furnace had three zones, first a loading zone, secondly the hot zone and finally a cooling off zone. The latter was connected to a humid free glove box with a dew point of −45° C. or below. A flow of dry air was constantly flowing through the tube from the glove box, thereby keeping the tube humid free during the calcination.

The calcination was conducted for 2 hours in the hot zone. Hereafter, the tray with the particulate metastable tetragonal zirconia aerogel was pushed into the cooling off zone and was kept for 0.5 hours. Thereafter, the tray and resulting material could be handled manually.

The resulting metastable tetragonal zirconia aerogel showed a content of tetragonal phase zirconia of 90% for $ZrO_2$ Aerogel 1 and above 85% for $ZrO_2$ Aerogel 2 analysed as a composite.

The resulting metastable tetragonal zirconia aerogel showed a phase transformation capability of 85% for both $ZrO_2$ Aerogel 1 and Aerogel 2 analysed as powder in air.

The density of the aerogel was approx. 2.5 g/cm$^3$.

Example 7—Preparation of Prepolymerized Aerogel Fillers (PAF)

An amorphous aerogel ("$ZrO_2$ Aerogel 2") was calcined as described in Example 3). The calcined tetragonal zirconia aerogel was placed in an excess of a monomer mixture (bisGMA:UDMA:TEGDMA:BPO-50,BHT (37.5:39:20:3:0.5 by weight)) and left for 10 days in order for the inner pores of the aerogel to become filled with the monomer mixture. The monomer mixture within the aerogel was then cured at 100° C. during 1 hour and crushed in a cryomill into required particle sizes (either 90-150 μm or 150-180 μm). After sieving, the powder could then be used for a composite fabrication such as mixing with monomers and fillers so as to obtain e.g. a dental material. All the listed steps were performed in humid free atmosphere with dew point below −45° C. The aerogel in the resulting "PAF" material showed a content of tetragonal phase zirconia of 60% and a phase transformation capability of 40%. The density of the prepolymerized aerogel filler was approx. 3.0 g/cm$^3$ Example 8—Preparation of a Composite Material (Model Example)

In the humid free atmosphere in the glove box, 20 vol % the particulate metastable tetragonal zirconia aerogel prepared according to Example 3 was mixed with 80 vol % of a resin system (bisGMA:UDMA:TEGDMA (40:40:20 by weight)+0.3 wt % campherquinone+0.6 wt % dimethylaminobenzoic acid ethyl ester (DABE)). After formulation, the particulate metastable tetragonal zirconia aerogel was essentially protected from immature triggering of the phase transformation in that is showed excellent stability (0% phase transformation) after storing for 10 days.

As desired, the mixture of resin and the particulate metastable tetragonal zirconia aerogel could be supplemented with glass fillers and colouring agents.

After compounding the composite, it may be filled into capsules containing 0.2 to 0.5 grams or syringes with between 2 and 6 grams. The capsules/syringes may have a metal coating so as to obtain a shelf life of the composite of at least 2 years.

Also, the refractive index of the individual composite components may be adjusted. In order to obtain a suitable transparency of a composite, the refractive index of its components should preferably be similar (typically with a difference not superseding 0.1). This is done by spiking the resin with nano-sized rutile ($TiO_2$) before the particulate metastable tetragonal zirconia aerogel is added. As much rutile as possible is added without compromising handling qualities of the final composite, e.g. in the range of 5-30 wt. %.

Example 9—Preparation of a Composite Material with Large Aerogel Particles

In the humid free atmosphere in the glove box, 20 vol % of one of the particulate metastable tetragonal zirconia aerogels prepared according to Example 3 and Example 6 was mixed with 80 vol % of a resin system (bisGMA: UDMA:TEGDMA (40:40:20 by weight)+0.3 wt % campherquinone+0.6 wt % dimethylaminobenzoic acid ethyl ester (DABE)). After formulation, the particulate metastable tetragonal zirconia aerogel was essentially protected from immature triggering of the phase transformation in that is showed excellent stability (0% phase transformation) after storing for 10 days.

As desired, the mixture of resin and the particulate metastable tetragonal zirconia aerogel could be supplemented with glass fillers and colouring agents.

After compounding the composite, it could be filled into capsules containing 0.2 to 0.5 grams or syringes with between 2 and 6 grams. The capsules/syringes may have a metal coating so as to obtain a shelf life of the composite of at least 2 years.

It has been shown an improved translucency of Example 9 compared with Example 8 such transparency increase as much as twice.

The invention claimed is:

1. A metastable tetragonal zirconia aerogel material having a density of 1.0-4.5 g/cm$^3$ and in particulate form having a particle size distribution wherein D10 value is from 30 μm to 100 μm.

2. The metastable tetragonal zirconia aerogel material according to claim 1 which has a proportion of tetragonal zirconia of at least 80% based on the total amount of zirconia in the aerogel material.

3. The metastable tetragonal zirconia aerogel material according to claim 1 which has a phase transformation capability of at least 60%.

4. The metastable tetragonal zirconia aerogel material according to claim 1 in particulate form having a particle size of less than 100 μm.

* * * * *